United States Patent Office 3,340,239
Patented Sept. 5, 1967

3,340,239
ALLYL ETHERS OF METHYL α-D-GLUCOSIDE POLYMERS AND COPOLYMERS
Richard G. Schweiger, San Diego, Calif., assignor to Kelco Company, San Diego, Calif., a corporation of Delaware
No Drawing. Filed May 12, 1965, Ser. No. 455,341
13 Claims. (Cl. 260—80.3)

This invention relates to novel allyl ethers of methyl glucoside and to a novel process of preparing the same and is a continuation-in-part of my application filed Aug. 27, 1963, Ser. No. 304,972, and now abandoned, entitled, Glucoside Derivatives and Process of Making Same.

Methyl α-D-glucoside is a polyhydric alcohol having a heterocyclic ring structure, and has the following chemical formula:

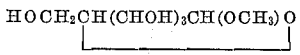

Methyl glucoside, as the above is commonly termed, has a molecular weight of 194, a melting point of 166–168° C., and is soluble to the extent of about 5% by weight in methanol and 180% by weight in water, at room temperature. It is commercially available in the United States in large quantity and high purity.

Methyl glucoside has been the subject of a number of investigations in which ether derivatives or ester derivatives are prepared. In most such procedures the extent of reaction is considerable. Indeed, because of the high reactivity of all four of the hydroxyl radicals, most of these generally enter into the reaction, and methyl glucoside has found an important place in the preparation of polyurethane foams, in alkyd resins, and the like, largely because of the high hydroxyl reactivity just mentioned.

Previous workers have made allyl ethers of methyl glucoside, but a procedure has not been given for the preparation of allyl ethers in which the degree of substitution (D.S.) is 1.0 or 2.0. A fully reacted allyl methyl glucoside will have a D.S. of 4.0, in view of the four hydroxyl groups in the starting compound. A tetra-allyl derivative, that is, allyl methyl glucoside with a D.S. of 4, has been described in the literature. This product is water insoluble and moreover, upon polymerization yields insoluble, brittle resins.

An object of the present invention is to provide a novel method of making allyl ethers of methyl α-D-glucoside having a D.S. of 1.0 or 2.0.

Another object of the invention is to provide, as novel water soluble compounds in themselves, allyl ethers of methyl α-D-glucoside, in which the D.S. is 1.0 or 2.0.

A further object of the invention is to provide polymers of allyl ethers of methyl α-D-glucoside in which the D.S. is 1.0 or 2.0.

Other objects of the invention will appear as the description thereof proceeds.

Generally speaking and in accordance with an illustrative embodiment of my invention, I bring together in a suitable reaction vessel, provided with an agitating means, methyl α-D-glucoside, a reactive allyl halide, a water soluble strong alkali, water, and a water immiscible solvent in which the diallyl ether of methyl α-D-glucoside is soluble; and I maintain the reaction mixture so prepared for a sufficient length of time, taking into account the selected reaction temperature, for the etherification reaction to proceed to the desired extent, to a selected D.S. 1.0 or 2.0; then I neutralize the alkali with a suitable acid, and I recover the product from the reaction mixture in any desired, suitable fashion.

As suitable allyl halides, I may use allyl chloride or allyl bromide. I prefer and find best the chloride and it has the advantage of lower cost.

As a water soluble strong alkali I may use sodium hydroxide, potassium hydroxide, lithium hydroxide, and the like. I prefer and find best sodium hydroxide, and, again, it is economically attractive because of its low cost.

As a water immiscible solvent in which the diallyl ether of the methyl glucoside is soluble, I prefer toluene and find it best, but I may use benzene, xylene, cyclohexane, diethyl ether, dipropyl ether, dibutyl ether, mixed ethers such as ethyl propyl ether, ethyl butyl ether, propyl butyl ether, isomers thereof including isopropyl butyl ether, isobutyl propyl ether, diisopropylether, diisobutylether, and the like. The immiscible solvent selected should be one that will not react with the reagents used in my process. It is desirable to choose a water immiscible solvent having a high enough boiling point so that at the reaction temperature chosen, no pressure problems will arise. Thus, for example, I find most convenient and preferred a reaction temperature of 85 to 90° C., and this makes the use of toluene practicable, since the latter has a boiling point of 110° C. The alternative employment of benzene, for example, which has a boiling point of 80° C., would require either a correspondingly lower reaction temperature, and thus longer reaction time, or the use of a pressure vessel to carry out the reaction.

While I do not wish to be bound by any theory of operation, I believe that the success of the procedure in accordance with my invention is based upon the fact that the monoallyl ether of methyl α-D-glucoside is highly water soluble, but little soluble in toluene. The partition coefficient for the diallyl ether of methyl glucoside as between water and toluene is, however, strongly in favor of toluene, so that as soon as the etherification of a given molecule of methyl glucoside has proceeded to a D.S. of 2.0, the resulting di-substituted ether migrates into the toluene (or alternative selected solvent) phase, and as soon as it is in the toluene phase, it is protected from further etherification, since that reaction apparently takes place only in the aqueous phase. Proceeding in this fashion and with an adequate amount of allyl halide, the reaction can be carried out until a substantial portion of the methyl glucoside has been etherified to a D.S. of 2.0 and is thus found in the toluene phase. The reaction may be made to favor formation of the monoether by limiting the amount of allyl halide employed in the reaction mixture. For many purposes it is convenient to carry out the procedure so that a substantial proportion of each derivative is found in its respective liquid phase. Thus, an example appearing hereinbelow gives an instance of the conversion of about two-thirds of the product from the reaction mixture to a D.S. of 1.0, the remaining one-third having a D.S. of 2.0 I, of course, can also vary the ratio of mono- and diallyl ethers in a product produced by my method as aforementioned.

Concerning the range of materials and reaction conditions for carrying out my invention, I prefer to use from about 1 to 2 moles of allyl halide per mole of glucoside and an amount of alkali hydroxide equivalent to the amount of allyl halide employed. The water in the reaction mixture is preferably kept in the range of 100 to 150% of the weight of the alkali hydroxide. The volume of water immiscible solvent, e.g., toluene, in the reaction mixture should preferably be 1 to 2 times the volume of the allyl halide. It will be appreciated that the reaction temperature may be varied depending on the time employed to carry out the reaction. It will be found convenient and suitable to carry out the reaction in accordance with my invention at a temperature in the range of 80 to 100° C. with a reaction time of from 6 to 2 hours in a procedure in which the reaction is carried out at about atmospheric pressure.

An example of the procedure in accordance with the invention will now be given.

EXAMPLE I

One hundred g. of methyl α-D-glucoside was mixed thoroughly with a solution of 31 g. of sodium hydroxide in 35 ml. of water. A round bottom flask with three necks and equipped with mechanical stirrer, reflux condenser, and dropping funnel was used as the reaction vessel. After adjusting the temperature to 85 to 90° C., a mixture of 68 ml. of allyl chloride (1.6 moles/mole of glucoside) and the same volume of toluene was added slowly within about 4 hours. Heating and stirring was continued for 3 more hours. Then it was neutralized with acetic acid, steam-distilled, and extracted 5 times with ethyl ether in a separatory funnel. The ether layer was dried over sodium sulfate and concentrated to a syrup. The water layer was extracted continuously with ethyl ether for 48 hours, and the extract concentrated to a syrup also. Both products were distilled under reduced pressure. The first few grams of each distillate was discarded. Data on the products are shown in the following table.

|  | Extract I | Extract II |
| --- | --- | --- |
| B.P. (0.15 mm.) | 148–152 | 166–170 |
| Yield, g | 23.5 | 42.5 |
| D.S | 1.98 | 0.96 |

The determination of the D.S. was carried out by the addition of bromine to the double bonds. An excess of 0.1 N bromine solution was added to the aqueous solution of an aliquot of the sample to be determined. After keeping the mixture for 5 minutes, potassium iodide was added and the free iodine titrated with a 0.1 N sodium thiosulfate solution. The consumption of bromine per gram of product with a D.S. of 1 and of 2 (mono- and diallyl ethers) was calculated and plotted on a curve against the D.S. The D.S. of the samples to be determined was taken from this curve.

EXAMPLE II

In this example the amount of allyl chloride was 1.4 moles/mole of glucoside. The amount of sodium hydroxide was reduced correspondingly. After separation and distillation 49.5 g. of the monoallyl and 17.3 g. of the diallyl glucosides were obtained.

As will be noted from the examples hereinabove, a separation of the product into the monoallyl and the diallyl ether may readily be made based upon the difference of their solubility in organic solvents (such as ether) and water. The ratio of the diallyl ether to the monoether produced can be changed not only by changing the reaction time, as already noted, but it is also influenced by the ratio of allyl halide to methyl glucoside in the starting mixture. In general, a higher such ratio favors the diallyl ether and vice versa.

The products made in accordance with the invention have great utility. For example, they may be homopolymerized, using any of the techniques common for the polymerization of allyl monomers. The homopolymers may be used to form adhesives useful with glass and ceramic products. To homopolymerize my said materials, for example, they may be heated to 110 to 115° C. and polymerization catalyzed by passing oxygen through. Again, both the mono- and diallyl ethers of methyl glucoside may be co-polymerized in varying ratios with each other.

While my invention has been described with the aid of specific examples, it will be apparent that many variations can be made in starting materials, proportions, reaction temperature, reaction times, after treatment of the products, and the like, all within the broad scope of the invention, as set forth in claims which follow.

I claim:

1. The process of producing monoallyl and diallyl ethers of methyl α-D-glucoside which comprises the steps of forming a reaction mixture of methyl α-D-glucoside, 1 to 2 moles of allyl halide per mole of said glucoside, an amount of alkali hydroxide equivalent to the amount of allyl halide, water in an amount of 100 to 150% of the weight of the said alkali hydroxide and a water immiscible solvent that will not react in the said reaction mixture and in which the diallyl ether of methyl α-D-glucoside is preferentially soluble, the said solvent being present in an amount in the range of 1 to 2 times the volume of the allyl halide in the said reaction mixture and maintaining said reaction mixture for a long enough period of time in the range of 6 to 2 hours at a selected temperature in the range of 80 to 100° C. until said methyl α-D-glucoside is substantially converted to the monoallyl and diallyl ethers thereof and without any appreciable conversion of said methyl α-D-glucoside to allyl ethers having a D.S. in excess of 2 and in which the said resulting diallyl ether of said methyl α-D-glucoside is dissolved preferentially in the said water immiscible solvent.

2. The process of producing monoallyl and diallyl ethers of methyl α-D-glucoside which comprises the steps of forming a reaction mixture of an allyl halide, methyl α-D-glucoside, a water soluble strong alkali, water, and a water immiscible solvent that will not react in the said reaction mixture and in which the diallyl ether of methyl α-D-glucoside is preferentially soluble; and maintaining said reaction mixture for a long enough period of time at a selected temperature until said methyl α-D-glucoside is substantially converted to the monoallyl and diallyl ethers thereof and without any appreciable conversion of said methyl α-D-glucoside to allyl ethers having a D.S. in excess of 2 and in which the said resulting diallyl ether of said methyl α-D-glucoside is dissolved preferentially in the said water immiscible solvent.

3. The process in accordance with claim 2 wherein said allyl halide is chosen from the group consisting of allyl chloride and allyl bromide.

4. The process of claim 2 in which said alkali is chosen from the group consisting of sodium hydroxide, potassium hydroxide, and lithium hydroxide.

5. The process in accordance with claim 2 wherein said water immiscible solvent is chosen from the group consisting of toluene, benzene, xylene, cyclohexane, diethyl ether, dipropyl ether, dibutyl ether, ethyl propyl ether, ethyl butyl ether, propyl butyl ether, isopropyl butyl ether, isobutyl propyl ether, diisopropyl ether and diisobutyl ether.

6. The process of producing a monoallyl ether of methyl α-D-glucoside having a boiling point of 166 to 170° C. at 0.15 mm. Hg and a D.S. of 1, comprising the steps of forming a reaction mixture of an allyl halide, methyl α-D-glucoside, a water soluble strong alkali, water, and a water immiscible solvent that will not react in the said reaction mixture and in which the diallyl ether of methyl α-D-glucoside is preferentially soluble, maintaining said reaction mixture for a long enough period of time at a selected temperature until said methyl α-D-glucoside is substantially converted ot the monoallyl and diallyl ethers of methyl α-D-glucoside, maintaining contact between the aqueous and water immiscible solvent during the said time of reaction, and thereby causing the said resulting monoallyl ether of methyl α-D-glucoside to dissolve in the water phase and the resulting diallyl ether of methyl α-D-glucoside formed in said reaction to be separated from said water soluble glucoside by preferentially dissolving in the said water immiscible solvent.

7. The process of producing diallyl ether of methyl α-D-glucoside having a boiling point of 148 to 152° C. at 0.15 mm. Hg and a D.S. of 2, which comprises the steps of forming a reaction mixture of an allyl halide, methyl α-D-glucoside, a water soluble strong alkali, water, and a water immiscible solvent that will not react in the said reaction mixture and in which the diallyl ether of methyl α-D-glucoside is preferentially soluble, maintaining said reaction mixture for a long enough period of time at a selected temperature until said methyl α-D-glucoside is substantially converted to the monoallyl and diallyl ethers of methyl α-D-glucoside, maintaining contact between the aqueous and water immiscible solvent during the said time of reaction, and thereby causing the formation of diallyl ether of methyl α-D-glucoside and preferential solubility thereof in the said water immiscible solvent, and separating said solvent-diallyl glucoside phase form the resulting water phase containing monoallyl methyl α-D-glucoside.

8. Monoallyl ether of methyl α-D-glucoside having a boiling point of 166 to 170° C. at 0.15 mm. Hg and a D.S. of 1, said glucoside ether being essentially free of glucoside ethers having a D.S. of 2 or more.

9. Diallyl ether of methyl α-D-glucoside having a boiling point of 148 to 152° C. at 0.15 mm. Hg and a D.S. of 2.

10. A polymer of monoallyl ether of methyl α-D-glucoside having a boiling point of 166 to 170° C. at 0.15 mm. Hg and a D.S. of 1, said glucoside ether being essentially free of glucoside ethers having a D.S. of 2 or more.

11. A polymer of diallyl ether of methyl α-D-glucoside having a boiling point of 148 to 152° C. at 0.15 mm. Hg and a D.S. of 2.

12. A copolymer of monoallyl ether of methyl α-D-glucoside having a boiling point of 166 to 170° C. at 0.15 mm. Hg and a D.S. of 1, said glucoside ether being essentially free of glucoside ethers having a D.S. of 2 or more, and diallyl ether of methyl α-D-glucoside having a boiling point of 148 to 152° C. at 0.15 mm. Hg and a D.S. of 2.

13. A mixture of a monoallyl ether of methyl α-D-glucoside having a boiling point of 166 to 170° C. at 0.15 mm. Hg and a D.S. of 1, and a diallyl ether of methyl α-D-glucoside having a boiling point of 148 to 152° C. at 0.15 mm. Hg and a D.S. of 2.

References Cited
UNITED STATES PATENTS 2,609,370  9/1952  Gaver et al. _____ 260—210

LEWIS GOTTS, *Primary Examiner.*

J. R. BROWN, *Assistant Examiner.*